United States Patent [19]

Dziondziak

[11] Patent Number: 5,039,531
[45] Date of Patent: Aug. 13, 1991

[54] BEER AND METHOD OF PRODUCING THE SAME

[75] Inventor: Klaus Dziondziak, Kreuztal-Krombach, Fed. Rep. of Germany

[73] Assignee: Holsten-Brauerei AG, Hamburg, Fed. Rep. of Germany

[21] Appl. No.: 492,368

[22] Filed: Mar. 9, 1990

Related U.S. Application Data

[63] Continuation of Ser. No. 73,898, Jul. 13, 1987, abandoned, which is a continuation-in-part of Ser. No. 689,554, Jan. 7, 1985, abandoned.

[30] Foreign Application Priority Data

Nov. 22, 1984 [EP] European Pat. Off. ........ 84114093.2

[51] Int. Cl.$^5$ ............................................. C12C 11/04
[52] U.S. Cl. ...................................... 426/16; 426/28; 426/29; 426/592
[58] Field of Search ...................... 426/16, 28, 29, 592

[56] References Cited

U.S. PATENT DOCUMENTS

| | | | |
|---|---|---|---|
| 87,599 | 3/1869 | Stone | 426/16 |
| 1,117,613 | 11/1914 | Wahl | 426/16 |
| 1,390,711 | 9/1921 | Heuser | 426/14 |
| 1,432,422 | 10/1922 | Stahl | 426/16 |
| 1,537,252 | 5/1925 | Meyer et al. | 426/16 |
| 1,673,275 | 6/1928 | Wallerstein | 426/16 |
| 1,892,342 | 12/1932 | Haselbach | 426/16 |
| 2,789,907 | 4/1957 | Haselbach | 426/16 |
| 3,291,613 | 12/1966 | Raible | 426/16 |

FOREIGN PATENT DOCUMENTS

| | | | |
|---|---|---|---|
| 11850 | 5/1880 | Fed. Rep. of Germany | 426/16 |
| 1266266 | 4/1968 | Fed. Rep. of Germany | |
| 1442238 | 12/1968 | Fed. Rep. of Germany | |
| 2323094 | 11/1974 | Fed. Rep. of Germany | |
| 2405543 | 8/1975 | Fed. Rep. of Germany | |
| 1426676 | 5/1966 | France | |
| 1597724 | 8/1970 | France | 426/16 |
| 1234 | of 1888 | United Kingdom | 426/16 |

OTHER PUBLICATIONS

Vijaikishore et al., "Glycerol Production by Fermentation" Appl. Biochem. Biotechnol. (1984) pp. 243–253, Chem. Abst. No. 101:169018b.

JGC Corp, "Continuous Production of Ethanol by Yeasts", Chem. Abstract vol. 96, No. 160811a (1982).

Economic Microbiology vol. 1, Alcoholic Beverages Academic Press Publisher, 1977 pp. 26 and 30, A. H. Rose Editor.

Arch. of Biochemistry, 7, 1, 257 (1945).

16-Fermentations vol. 79, 1983, p. 76941.

Microbiology abstracts, section A, vol. g No. 4 Apr. 1974, Industrial and Applied Microbiology, p. 514A.

*Primary Examiner*—R. B. Penland
*Attorney, Agent, or Firm*—Michael J. Striker

[57] ABSTRACT

A beer containing 0.3 to 2.3 volume percent of glycerol and a method of manufacturing said beer in which glycerol is added to the beer produced by a conventional brewing method or the fermentation is carried out in the presence of a yeast producing a sufficient glycerol content of the beer without glycerol addition.

24 Claims, No Drawings

BEER AND METHOD OF PRODUCING THE SAME

This application is a continuation of application Ser. No. 073,898, filed July 13, 1987 abandoned, which in turn is a continuation of Ser. No. 689,554, filed Jan. 7, 1985, both abandoned.

BACKGROUND OF THE INVENTION

The present invention relates to a beer, particularly low-alcohol or alcohol-free beer, and to a method of producing such beer.

A plurality of methods of manufacturing low-alcohol or alcohol-free beers have been known in the art, in which from beer, produced by conventional brewing process and having a normal alcohol content, a portion of alcohol is withdrawn. In the method disclosed in DE-OS 1,442,238 alcohol is evaporated from beer in a thin layer-evaporator at the temperatures below 70° C.

In the similar method disclosed in DE-AS 1,266,266 beer is firstly subjected to an atomization evaporation in vacuum and then the residuals are reblended and impregnated with carbonic acids.

Methods for an adsorptive alcohol removal are disclosed, for example in DE-OS 2,405,543. A method of producing of alcohol-free beer by a reverse osmosis is disclosed in DE-OS 2,323,094.

Furthermore, methods of manufacturing of alcohol-free beer by breaking a fermentation or boiling of beer in brewing pans have been also proposed. Finally, there has been also a possibility to remove alcohol from beer by high-pressure extraction with fluid $CO_2$.

All known methods for the alcohol removal from beer have the disadvantage that, besides the reduction of the alcohol content which is important for the bodied beer, other beer ingredients which affect a total sensitive impression of beer and therefore the quality of low-alcohol or alcohol-free beer were removed. It has been also found that the reverse osmosis and high-pressure extraction methods have required an expensive and troublesome equipment and have involved a number of technical difficulties which have not been overcome in practice.

Also full beers, diet beers, strong beers and beers of low original wort content with an alcohol content between about 1.5 and 6.0 weight percent depending on the raw materials and fermentation conditions used can be improved in their bodyness and other taste qualities.

SUMMARY OF THE INVENTION

It is an object of the present invention to provide an improved beer, particularly an improved alcohol-free or low-alcohol beer.

It is another object of this invention to provide a simple inexpensive method of manufacturing beer of improved bodiness which can be adapted to produce such improved beer from malt, hop and water as the only raw materials.

These and other objects of the present invention are attained by a beer, particularly a low-alcohol or alcohol-free beer, comprising from 0.3 to 2.3 volume percent of glycerol whereby the full body of the beer is improved.

The glycerol content in the beer may be between 0.4 and 1.5 volume percent, preferably between 0.5 and 1.2 volume percent.

With conventional brewing methods during the fermentation of the wort there is produced besides ethyl alcohol also a small amount of glycerol which, however, in conventional beer does not exceed 2 g/l. It is also known that certain special yeasts, for example *zygosaccharomyces acidifaciens Nickerson,\* Saccharomyces rouxii* and *Saccharomyces mellis* besides the production of alcohol, transform up to 50% of the consumed carbohydrate into glycerol. These yeasts, however, up to now have not been tested for or used in beer brewing.

\* Described in: Arch. of Biochemistry, 7, 1, 257 (1945).

It has been surprisingly discovered that a low-alcohol or alcohol-free beer having a glycerol content between 0.3 and 2.0 volume percent not achievable by conventional beer brewing methods, has such an improved full taste and body that it can hardly be distinguished from beers of non-reduced alcohol content, so that it is desirable to produce beer having such an glycerol content.

The overall glycerol content in the beer may consist of glycerol produced in situ by a fermentation of a wort in the presence of a yeast producing an increased glycerol content or may consist predominantly of glycerol introduced to a wort or a beer before or after an alcohol removal.

The beer may further comprise 0.05 to 0.5 volume percent of at least one type of sugar alcohol.

The volume percent of sugar alcohol may be 0.1 to 0.3.

The sugar alcohol may be erythritol and/or d-arabitol.

The objects of this invention are further attained by a method of producing beer, particularly a low-alcohol or alcohol-free beer by fermentation of a wort, an optional subsequent alcohol removal and the addition of glycerol, or by carrying out the fermentation under conditions adapted to an increased glycerol formation so as to obtain a glycerol content in the beer between 0.3 and 2.0 volume percent.

In a method for producing a low-alcohol beer from a beer made in accordance with a conventional brewing process and having an alcohol content above 1.5 weight percent after reducing the alcohol content to between 0.5 and 1.5 weight percent by evaporation, reverse osmosis, alcohol adsorption or pressure extraction, and eventual dilution and recarbonization, the glycerol content in the beer is adjusted to be between 0.3 and 1.0 volume percent.

In a method for producing a substantially alcohol-free beer from a beer made in accordance with a conventional brewing process and having originally an alcohol content above 1.5 weight percent after reducing the alcohol content to values below 0.5 weight percent and preferably below 0.1 weight percent, by evaporation, reverse osmosis, alcohol adsorption or pressure extraction, and optional redilution and recarbonization the glycerol content is adjusted to between 0.5 and 1.8 volume percent.

The glycerol may be added to the beer as a glycerol-containing liquid, before or after the alcohol removal in the wort.

Said liquid may be a beer with an adequate glycerol content.

If the beer is subjected to a thin-layer-evaporation in vacuum, a glycerol-containing liquid may be added to the evaporated beer before or after a possible redilution of the beer.

When the fermentation of the wort is carried out in the presence of an osmophilic yeast, the fermentation conditions should be selected such that there are obtained beer-typical conditions and an increased production of glycerol instead of ethyl alcohol. To this purpose specifically processed brewing malts may be used. It is also proposed herein to add sugars fermentable by osmophilic yeasts, particularly starch sugar, because such yeasts during fermentation cannot consume most of the carbohydrates of the malt. In this case the added sugar represents the main carbon source for the anaerobic fermentation. Besides other beer-type metabolism products the obtained ratio between glycerol production and alcohol production can be about 1: 0.8–0.9. In such a fermentation there are produced, based on glycerol, about one third of its amount of acetic acid and about 4% of its amount of lactic acid, both of which during alcohol removal in vacuum are evaporated from the beer together with the ethyl alcohol so that the flavour qualities of the beer are not affected.

After fermentation the beer obtained before or after an alcohol removal may be blended with beer produced by other methods and/or subjected to a maturation and/or an afterfermentation with the same or another yeast.

The technically and economically simplest method of producing an improved beer comprises the addition of glycerol or a glycerol-containing liquid to the beer produced by fermentation of the wort, before or after an alcohol withdrawal, whereby the body and flavour qualities of the beer are substantially improved.

DETAILED DESCRIPTION OF THE PREFERRED EMBODIMENTS

Example I

A commercial high quality Pilsen type beer of mild bitterness produced by conventional methods and having an original wort content of 12 weight percent, a real extract content of 4 weight percent, an alcohol content of 4 weight percent and a bitterness value of about 25 EBC-units is subjected to vacuum distillation to produce, on the one hand, a low-alcohol beer with an alcohol content of 1.5 weight percent and on the other hand, an alcohol-free beer with an alcohol content below 0.05 weight percent. There is added 0.5 volume percent of pure glycerol to the low-alcohol beer, and 0.85 volume percent of pure glycerol (Merck 4093, EWG-Ni-E422) to the alcohol-free beer. Thereafter both trial beers are rediluted with water to their initial volume and recarbonized. In a tasting trial both alcohol-reduced beers as compared to said commercial beer, were superior in scent, practically the same in taste and bodyness and had with the same foam appearance a better foam retention and foam adherence.

Example II

For the production of an alcohol-free beer corresponding in taste to the commercially available Pilsen type beer utilized in Example I, there is prepared from a malt having an albumen content of 16 weight percent, a color of 6 EBC, a color of boiled wort of 11 EBC (based on congress wort), a viscosity of congress wort of at least 1.75 mPas, a coarse and fines difference of 3 weight percent, an albumen solution degree of 44% and content of soluble nitrogen in 100 ml of 12% of laboratory wort of above 130 mg, in accordance with a two-step mashing method using a temperature sequence of 50°/75°/77° C. for obtaining a low apparent final fermentation degree of about 35% a wort having an original wort content of 11 weight percent and bitterness value of 48 EBC-units. Said wort is fermented by pressure fermentation with a bottom-fermented yeast at fermentation temperatures between 15° and 18° C. up to final fermentation (real extract content 8 weight %, alcohol content 1.5 weight percent) and the beer is then subjected to a final warm maturation phase for 24 hours. The obtained beer is then dealcoholized in a vacuum rotation evaporator at a pressure of about 15 mm Hg and temperatures of about 30° C. to a residual alcohol content of 0.1 weight percent. The residuals are rediluted with water to a real extract content of 4% and added with 0.65 volume percent of glycerol and recarbonized. The alcohol-free beer obtained, as compared to the commercial beer used in example 1 is somewhat weaker in scent, however, much better in taste and as good in bitterness. The foam retention and foam adherence of this beer are better.

Example III

An alcohol-free beer is produced by the method of Example II, but using top-fermented yeasts at fermentation temperatures between 20° and 25° C. This alcohol-free beer due to its higher content of fermentation side products is clearly better in scent and is as good in other qualities, as compared to the commercial beers of example 1. Trial beer is assessed altogether somewhat better as the commercial beer used in example I.

Example IV

A wort produced from the malt of Example II according to the same two-step mashing process and having an original wort content of 14 weight percent (8 weight percent from the malt addition and 6% from the addition of starch sugar) and a bitterness value of 48 EBC-units is then fermented by pressure fermentation at a fermentation temperature of about 25° C. in the presence of *Zygosaccharomyces acidifaciens Nickerson* up to a final fermentation (based on this yeast) with an real extract content of 9 weight percent, an alcohol content of 1.15 weight percent, a glycerol content of 1.35 weight percent, an acetic acid content of 0.45 weight percent and a lactic acid content of 0.05 weight percent. The obtained product undertakes a warm maturation phase for 24 hours, then is adjusted in a vacuum rotation evaporator to a residual alcohol content of 0.1 weight percent and residual acid content of 400 mg/l, rediluted to a real extract content of 4.5%, and recarbonized. With respect to the real extract content it should be noted that 1.35 weight percent of glycerol corresponds to a real extract content of about 1 weight percent so that in the absence of glycerol the extract content prior to dealcoholizing would be 8 weight percent and after the redilution would be 4 weight percent. This beer also has a Pilsen character, and in its bodiness and its other taste properties is equivalent to the commercial beer of Example I.

Example V

A commercial Pilsen type beer having an original wort content of 11.4 weight percent, real extract content of 3.8 weight percent and an alcohol content of 3.7 weight percent is blended with a beer produced by the malt and the mashing method of Example II having an original wort content of 15 weight percent, a real extract content of 13 weight percent and an alcohol content of about 1 weight percent, and with water in a weight ratio 3:1:4. The obtained mixture having an original wort content of 6.15 weight percent, a real extract content of 3.05 weight percent and an alcohol content of about 1.5 weight percent is thereafter adjusted in a vacuum rotation evaporator to a residual alcohol content of about 0.1 weight percent, rediluted with water to its initial volume, admixed with 0.65 volume percent of glycerol, and recarbonized. The resulting beer has Pilsen character and is better in scent, bodiness and bitterness, as the commercial beer used in example V while the other taste characteristics of this beer are the same. The foam of the trial beer is more finely porous and has a better retention and adherence. The trial beer was preferable by the tasting panel.

Example VI

A beer of lower original wort content produced in accordance with the method of Example I from the same raw material quantities and qualities (original wort content 8 weight percent, real extract content 2.7 weight percent, alcohol content 2.7 weight percent, bitterness value 25 EBC units) is admixed with 0.5 volume percent of glycerol. The obtained beer has Pilsen character and its scent and flavor are better than of those of the commercial beer of example I, while in the foam quality, bitterness and bodyness there exist no significant differences. Again the trial beer was preferred by the tasting panel.

It will be understood that each of the elements described above, or two or more together, may also find a useful application in other types of beers and methods of producing the same differing from the types described above.

While the invention has been illustrated and described as embodied in a beer and a method of making the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a beer which is alcohol free or has a low alcohol content of at most 1.5 weight percent, the improvement consisting essentially of from 0.3 to 2.3 volume percent of glycerol so as to have a full taste and body hardly distinguishable from that of a beer of a nonreduced alcohol content.

2. The beer of claim 1, wherein the glycerol content in the beer is between 0.4 and 1.5 volume percent.

3. The beer of claim 1, wherein the glycerol content in the beer is between 0.5 and 1.2 volume percent.

4. The beer of claim 1, wherein the overall glycerol content in the beer consists of in situ formed glycerol produced by a fermentation of a wort in the presence of a yeast producing an increased glycerol content.

5. The beer of claim 1, wherein the glycerol content consists predominantly of glycerol added to a wort before or after an alcohol removal.

6. The beer of claim 1, which further consists essentially of 0.05 to 0.5 volume percent of at least one type of sugar alcohol.

7. The beer of claim 6, wherein the volume percent of sugar alcohol is 0.1 to 0.3.

8. The beer of claim 6, wherein said sugar alcohol is selected from the group consisting of erythritol, d-arabitol and mixtures thereof.

9. In a method of producing beer which is alcohol free or has a low alcohol content of at most 1.5 weight percent by a fermentation of a wort and a subsequent alcohol removal, said wort containing malt carbohydrates, the improvement consisting essentially of adding glycerol to the beer of fermenting said wort in the presence of an osmophilic yeast, thereby producing glycerol in the beer, and adjusting the glycerol content in the beer between 0.3 to 2.3 volume percent.

10. The method of claim 9, wherein the glycerol content is between 0.5 and 1.2 volume percent.

11. The method of claim 9, wherein the glycerol is added to the beer as a glycerol-containing liquid before or after the alcohol removal in the wort.

12. The method of claim 11, wherein said liquid is a beer with a substantial glycerol content.

13. The method of claim 9, including the steps of subjecting the beer to a thin-layer-evaporation in vacuum and adding a glycerol-containing liquid into an evaporated beer before or after a redilution of the beer.

14. The method of claim 9, wherein said osmophilic yeast is *Zygosaccharomyces acidifaciens Nickerson*.

15. The method of claim 9, wherein said osmophilic yeast is *Saccharomyces rouxii*.

16. The method of claim 9, wherein said osmophilic yeast is *Saccharomyces mellis*.

17. The method of claim 9, further including the step of adding a yeast which cannot consume most of said malt carbohydrates.

18. The method of claim 17, wherein a fermentable sugar is additionally brought into the wort.

19. The method of claim 18, wherein said fermentable sugar is a starch sugar.

20. The method of claim 9, for producing beer having a low alcohol content of at most 1.5 weight percent, further consisting essentially of adjusting the beer from an original alcohol content above 1.5 weight percent to an alcohol content between 0.5 and 1.5 weight percent by evaporation, reverse osmosis, alcohol adsorption or pressure extraction and redilution and recarbonizing of said low alcohol beer to provide a glycerol content in the beer of between 0.3 and 1.0 volume percent.

21. The method of claim 20, wherein the glycerol content is between 0.4 and 0.7 volume percent.

22. The method of claim 9, for producing a substantially alcohol-free beer, further consisting essentially of adjusting beer from an original alcohol content above 1.5 weight percent to an alcohol content below 0.5 weight percent by an evaporation, reverse osmosis, alcohol adsorption or pressure extraction and a subsequent redilution and recarbonizing of said substantially alcohol-free beer, whereby the glycerol content is between 0.5 and 1.8 volume percent.

23. The method of claim 22, wherein the glycerol content is between 0.7 and 1.4 volume percent.

24. The method of claim 22, wherein the glycerol content is between 0.8 and 1.1 volume percent.

* * * * *